(12) United States Patent
Morris

(10) Patent No.: US 10,043,611 B1
(45) Date of Patent: Aug. 7, 2018

(54) SEISMIC RESISTANT MULTI-TRANSFORMER CLUSTER BRACKET WITH ADJUSTABLE DIAGONAL BRACES

(71) Applicant: David L. Morris, Rancho Cucamonga, CA (US)

(72) Inventor: David L. Morris, Rancho Cucamonga, CA (US)

(73) Assignee: INWESCO INCORPORATED, Azusa, CA (US)

( * ) Notice: Subject to any disclaimer, the term of this patent is extended or adjusted under 35 U.S.C. 154(b) by 176 days.

(21) Appl. No.: 15/140,721

(22) Filed: Apr. 28, 2016

(51) Int. Cl.
| | |
|---|---|
| *H01F 29/00* | (2006.01) |
| *A47G 1/00* | (2006.01) |
| *F21V 35/00* | (2006.01) |
| *H01F 27/06* | (2006.01) |
| *F16M 13/02* | (2006.01) |

(52) U.S. Cl.
CPC ............. *H01F 27/06* (2013.01); *F16M 13/02* (2013.01)

(58) Field of Classification Search
USPC ........... 336/67, 65, 66, 68; 248/218.4–219.4, 248/227.3
See application file for complete search history.

(56) References Cited

U.S. PATENT DOCUMENTS

| | | | | | |
|---|---|---|---|---|---|
| 2,990,151 | A | * | 6/1961 | Phillips | F16L 3/24 |
| | | | | | 211/107 |
| 3,374,978 | A | * | 3/1968 | Salmon | H01F 27/06 |
| | | | | | 211/107 |
| 3,734,438 | A | * | 5/1973 | Kautz | H01F 27/06 |
| | | | | | 211/107 |
| 3,856,250 | A | * | 12/1974 | Farmer | H01F 27/06 |
| | | | | | 211/107 |
| 4,103,853 | A | * | 8/1978 | Bannan | H02B 5/02 |
| | | | | | 211/107 |
| 4,781,348 | A | * | 11/1988 | Cutforth | H01F 27/06 |
| | | | | | 211/107 |
| 4,903,927 | A | * | 2/1990 | Farmer | H01F 27/06 |
| | | | | | 211/107 |
| 5,193,774 | A | * | 3/1993 | Rogers | H01F 27/06 |
| | | | | | 211/107 |
| 6,378,821 | B1 | * | 4/2002 | McKelvy | H02B 5/02 |
| | | | | | 211/107 |

* cited by examiner

*Primary Examiner* — Elvin G Enad
*Assistant Examiner* — Kazi Hossain
(74) *Attorney, Agent, or Firm* — William L. Chapin

(57) ABSTRACT

A seismic resistant cluster bracket for mounting to an electrical power-line pole and supporting power distribution transformers includes a rectangular support frame which has upper and lower horizontal cross beams secured to left, right, and center vertical strong-back struts. Pole-mount brackets protruding rearward from the center strong-back are provided with bolt holes for receiving bolts to attach the support frame to a power pole. Top and bottom safety mount brackets, each having vertical stabilizer ribs for engaging indentations of a rear transformer bracket are attached to the front of each strong-back. A pair of adjustable extension length diagonal braces spaced equal distances laterally outwards from the center strong-back are pivotal mounted to the rear side of the support frame, extendable to adjustable lengths and boltable to a power pole to secure the frame against movements relative to the power pole as a result of static weight loading or seismic vibrations.

24 Claims, 11 Drawing Sheets

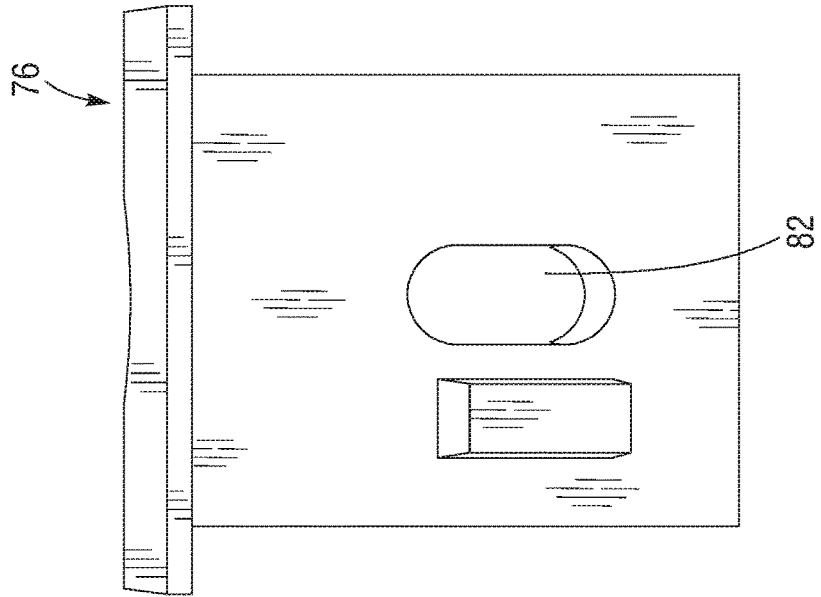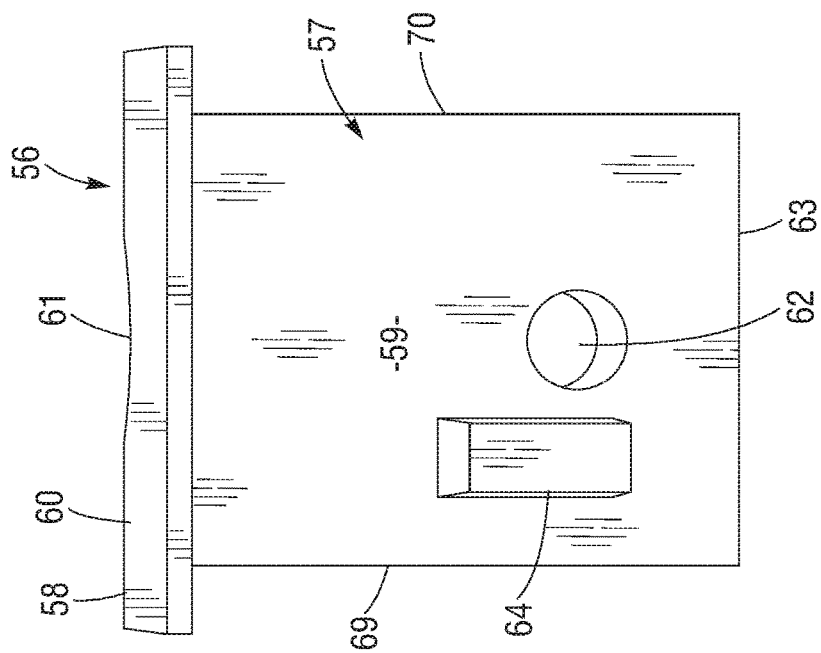

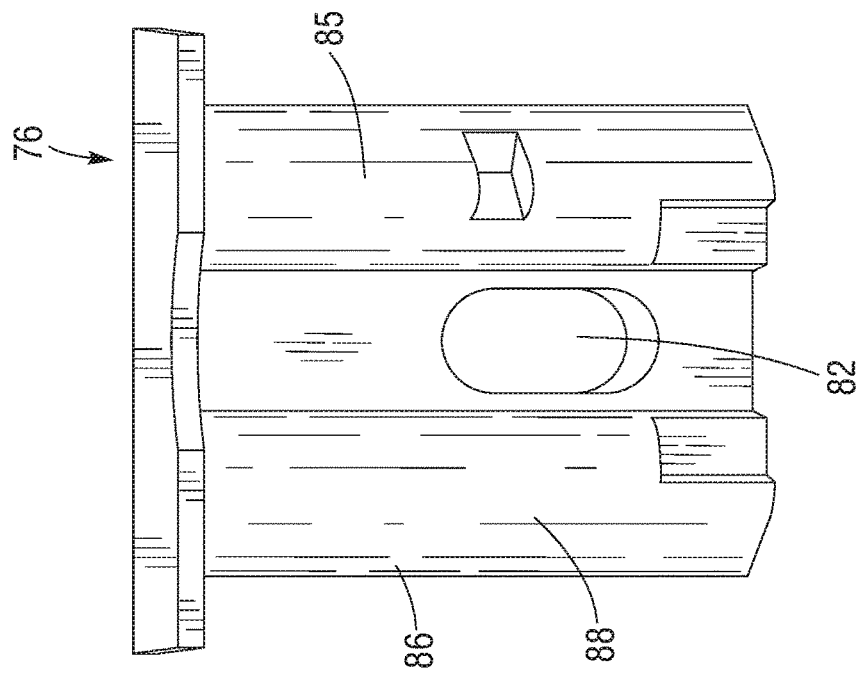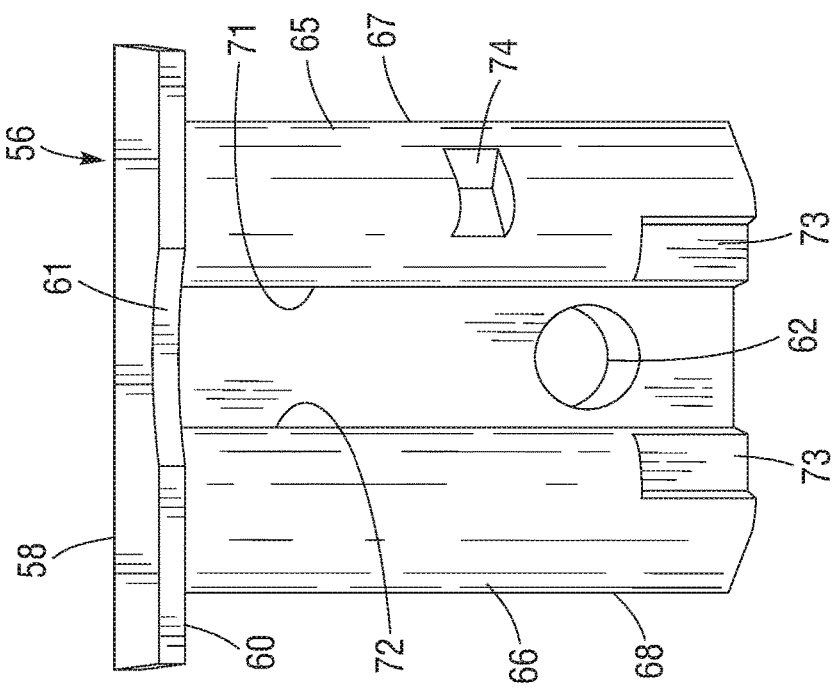

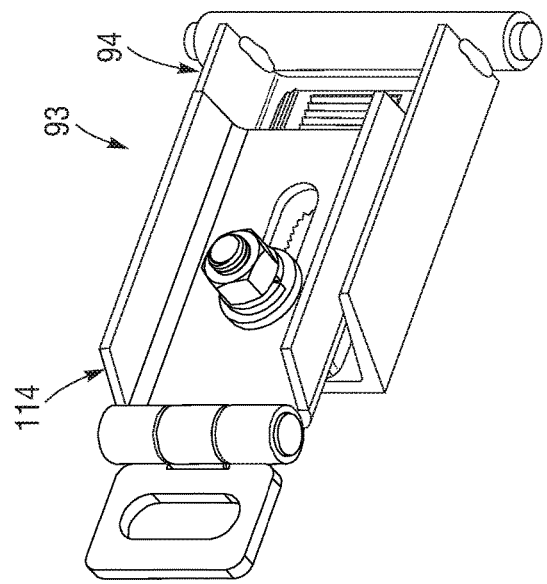
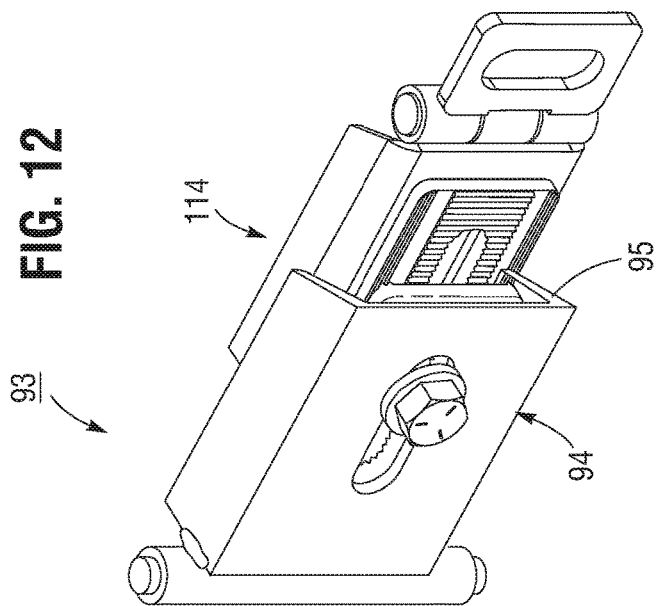

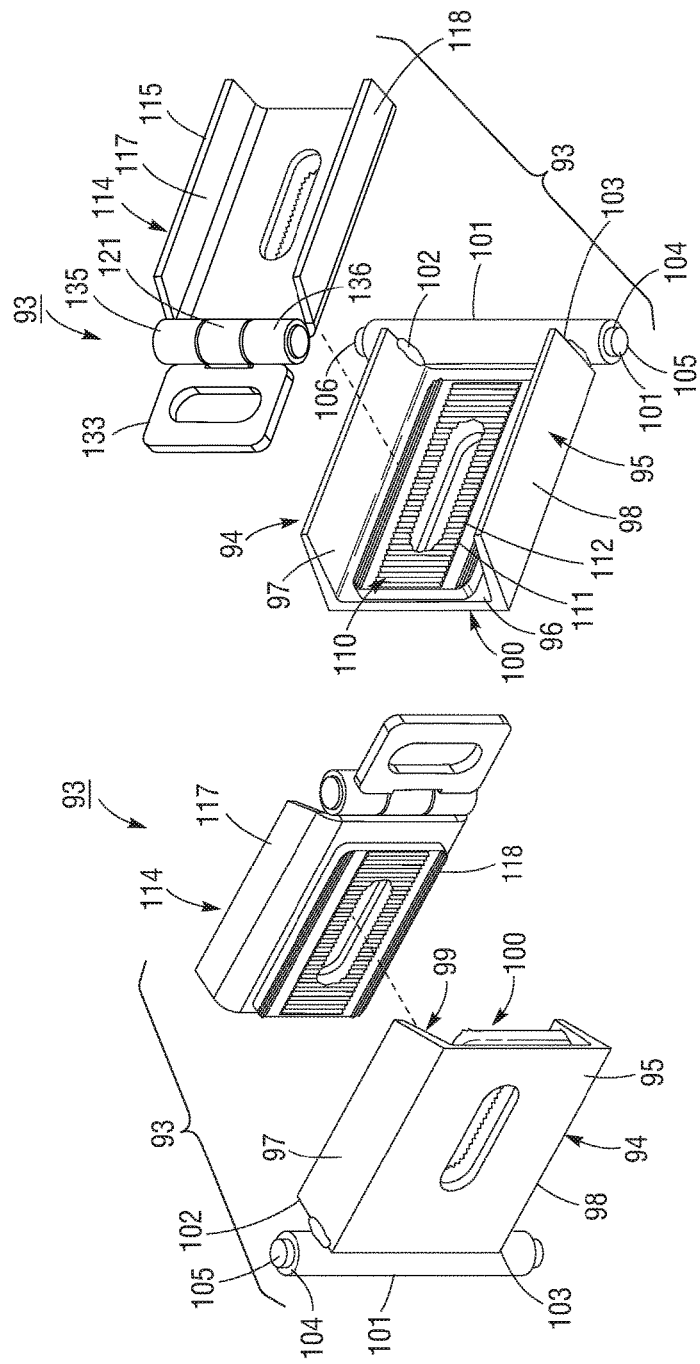

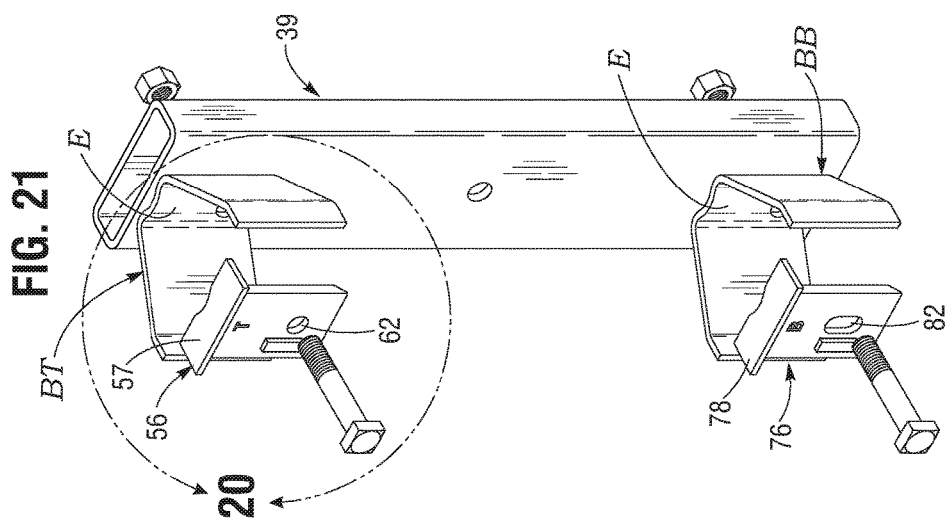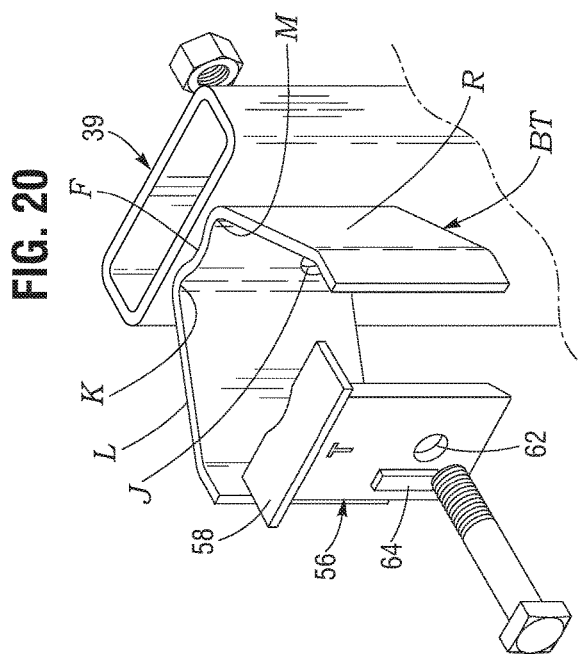

SEISMIC RESISTANT MULTI-TRANSFORMER CLUSTER BRACKET WITH ADJUSTABLE DIAGONAL BRACES

BACKGROUND OF THE INVENTION

A. Field of the Invention

The present invention relates to equipment used in electrical power distribution systems which utilize pole-mounted power lines and distribution transformers. More particularly, the invention relates to a novel seismic-resistant cluster bracket for mounting to a power pole and supporting multiple distribution transformers, which utilizes adjustable-span diagonal braces to limit damaging and potentially catastrophic displacement of the cluster bracket and transformers from the pole during a seismic event.

B. Description of Background Art

Systems for distributing electrical power produced by power generation stations which uses hydro, nuclear, or fossil-fuel energy sources typically employ a cascaded arrangement of transmission lines. A typical distribution network includes high tension lines carrying current at very high voltages of the order of 110 kV to 220 kV (kilovolts) which are supported by steel towers. The high tension lines carry electrical power from a power generating station to one or more substations, where large, ground mounted transformers step down current in a 110 kV-220 kV voltage range to voltages in an intermediate voltage range of about 2.4 kV to 34.5 kV.

Intermediate voltage range power lines which convey power to locations of businesses, residences, and other consumers of electrical power, are in many cases supported by upright wooden power poles. Although heavy industrial consumers sometimes require higher voltages, three-phase electrical current is usually supplied at a maximum voltage of about 440 volts to industrial users. Typically a three-wire configuration is used to supply both 240-volt and 120-volt current to residential consumers. In both cases, pole-mounted distribution transformers are required to step down current carried by of substation power lines in an intermediate voltage range to lower voltages of 440, 240, or 120 volts.

Since typical pole-mounted transformers provide electrical power to multiple residential and/or commercial electrical power consumers, pole-mounted distribution transformers must handle relatively large power levels, typically of the order of 150-200 kVA or more. Consequently, pole-mounted distribution transformers are large and heavy, often weighing 2,000 lbs. or more. Moreover, many, if not most, electrical power distribution systems utilize three-phase electrical power lines. Although three-phase power transformers are sometimes used to step down power-line current to lower voltages, most distribution systems use three separate electrically interconnected single-phase transformers to step down three-phase substation power. For that reason, power pole installations used to step down power supplied in an intermediate kilovolt range of several kilovolts to 440 v or 220 v power often employ three separate single-phase transformers. The three transformers are usually mounted on a multi-transformer, "cluster bracket" which is bolted to a wooden pole. A cluster bracket is usually fastened to a pole near its upper end, below upper cross arms which support high tension input power lines, and above lower cross arms which support lower-voltage output power lines.

Since, as stated above, each of the three single-phase distribution transformers supported by a cluster bracket can weigh 2,000 lbs. or more, it can be readily appreciated that cluster brackets must have a very rugged construction to enable them to support such a large static weight load.

Currently-used cluster brackets are typically mounted to a pole by two or more bolts which are pre-installed in a power pole at a selected mounting height near the upper end of the pole. The shanks of the bolts protrude radially outwards from the poles, and are received through perforations through rear mounting plates of a cluster bracket. The cluster bracket is then secured in place by tightening nuts on the shanks of the bolts which protrude through the perforations in the mounting plates.

The present inventor has observed that after periods as short as 6 months, static weight loading of heavy transformers supported by a cluster bracket can cause stretching and downward bending of mounting bolt shanks. Also, it is known that lateral and vertical forces exerted on mounting bolts by seismic events can exert even larger dynamic bending and stretching strains on the mounting bolts.

For the foregoing reasons, there is a substantial concern that the cumulative effects of static and dynamic strains on the mounting bolts of currently used cluster brackets may result in the catastrophic failure of such cluster brackets, in the event of seismic events of sufficiently large magnitudes. That concern was a motivating factor in the present inventor's conception and development of a novel improved multi-transformer cluster bracket which provides greater resistance to both static and dynamic deformations of cluster bracket members and mounting bolts than present-generation cluster brackets, thus minimizing the possibility of catastrophic failure of the improved cluster brackets.

OBJECTS OF THE INVENTION

An object of the present invention is to provide an improved cluster bracket for supporting multiple heavy electrical power distribution transformers from a power pole.

Another object of the invention is to provide an improved multi-transformer cluster bracket for attachment to a power pole and supporting multiple power transformers, which has improved resistance to deformation of the bracket and mounting bolts that fasten the bracket to a power pole, both as a result of static weight loading exerted by heavy transformers, and vibrations induced by seismic events.

Another object of the invention is to provide a seismic-resistant multi-transformer cluster bracket which utilizes a pair of adjustable span-length hinged diagonal braces to secure both the bracket and bracket mounting bolts from deformations resulting from static weight-loading forces and dynamic seismic forces.

Various other objects and advantages of the present invention, and its most novel features, will become apparent to those skilled in the art by perusing the accompanying specification, drawings, and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations, and modifications of the invention reasonably inferable from the description contained herein be included within the scope of the invention as defined by the appended claims.

SUMMARY OF THE INVENTION

Briefly stated, the present invention comprehends an improved multi-transformer cluster bracket for mounting to a power-line pole and supporting heavy electrical power distribution transformers which are bolted to the cluster bracket. The multi-transformer cluster bracket according to the present invention has novel structural features which afford improved resistance to deformations of cluster bracket components and mounting bolts caused by static weight-loading exerted on them by heavy transformers. The novel design of a multi-transformer cluster bracket according the present invention also affords improved resistance to dynamic displacement of mounting bracket components and supported transformers in response to seismic shocks, thus minimizing the likelihood of catastrophic failure of power transformer mountings during seismic events.

A seismic-resistant multi-transformer cluster bracket according to the present invention includes a generally rectangularly-shaped support frame which has on a rear side thereof rear mounting members for attaching the frame to an upright power pole, and front mounting members for attaching and supporting at least one and typically three laterally-spaced apart electrical power distribution transformers.

The cluster bracket frame according to the present invention includes parallel and vertically spaced-apart upper and lower horizontally-disposed support cross-beams formed of U-shaped channel sections. The upper and lower cross-beams are secured to three vertical "strong-back" struts formed of rectangular cross-section channels, including a left side strong-back, a central strong-back, and a right-side strong-back. The three strong-backs are fastened to front sides of the upper and lower cross-beams. Each strong-back is reinforced by a set of three rectangular plates welded between inner opposed edges of the channel side walls, including upper-end and lower-end reinforcement plates adjacent to upper and lower transverse ends of each strong-back, and a longitudinal, centrally-located reinforcement plate.

The cluster bracket frame includes a vertically-disposed upper pole-mount bracket which is formed of a channel section which has a transverse cross-section that is generally U-shaped, modified by obliquely outwardly angled flat side walls. The upper pole-mount I bracket is fastened to the rear side of the upper horizontal support cross-beam, and extends vertically upwards of the upper horizontal side of the upper horizontal cross-beam. The upper pole-mount I bracket has disposed through its thickness dimension an upper keyhole-shaped pole-mount perforation for receiving an upper support bolt which is disposed through a power pole to which the cluster bracket is to be mounted. The upper pole-mount perforation is located on a longitudinal center line of the upper pole-mount bracket I, a short distance below the upper transverse edge of the upper pole-mount I bracket.

The cluster bracket frame also includes a vertically-disposed lower pole-mount bracket. The lower pole-mount bracket has a transverse cross-sectional shape similar to that of the upper pole-mount bracket, and is vertically aligned with the upper pole-mount bracket.

The lower pole-mount bracket is fastened to the rear side of the lower horizontal cross-beam I of the cluster bracket frame, and extends vertically downwards of the lower horizontal side of the lower horizontal cross-beam. The lower pole-mount bracket has disposed through its thickness dimension a lower circular perforation for receiving a lower support bolt which is disposed through a power pole to which the cluster bracket is to be mounted. The lower pole-mount bracket perforation is located on a longitudinal center line of the lower pole-mount bracket and is vertically aligned with the upper pole-mount I bracket perforation.

Preferably, the center strong-back of the cluster bracket frame is also provided with a perforation which is located between the upper and lower horizontal cross-beam. The third perforation is longitudinally aligned with the upper and lower perforations and is provided to receive a third power-pole mounting bolt.

According to the invention, the cluster bracket includes novel and improved mounting members for more securely supporting one to three laterally spaced-apart transformers from the cluster bracket frame. The transformer mounting members consist of three sets of safety mount brackets, each set consisting of an upper, "top" transformer support bracket and a lower, "bottom" transformer support bracket, which are attached to the front sides of the left-side, center, and right-side vertical strong-backs, respectively. According to the invention, the top and bottom transformer safety mount support brackets have a similar novel construction which provides a more secure fastening of a transformer bracket to the cluster bracket frame. Thus both the top and bottom transformer safety mount support brackets have a generally flat front vertical surface and a rear vertical surface that has a wave-shaped transverse cross-sectional shape which is complementary to that of curved outer transverse leg sections of upper and lower transformer brackets which protrude rearward from a standard pole-mounted power transformer.

The rear surface of each safety mount bracket has protruding rearward from a front plate part of the bracket two generally semi-cylindrically-shaped, vertically-disposed parallel stabilizer ribs or bosses which are laterally spaced-apart and have outer vertical sides which are adjacent to opposite vertical sides of the bracket plate. The stabilizing ribs are sized and shaped to fit conformally into similarly shaped indentations in the inner face of the outer transverse leg section of a transformer bracket, which has laterally opposed radially-disposed side leg sections that have inner ends which are welded to the outer cylindrical surface of a cylindrically-shaped transformer housing.

The upper and lower transformer brackets are fastened to the cluster bracket frame by first positioning the outer curved transverse leg section of an upper or lower transformer bracket adjacent to an upper or lower transformer bracket mounting point, respectively, on a left-side, center, or right-side strong-back. An upper or lower safety mount bracket plate is then positioned within the open space between the outer transverse leg section of an upper or lower transformer bracket and the transformer housing, with the rearward facing stabilizer ribs of the safety mount bracket plate aligned with the curved indentations in the inner side of the transverse leg section of a transformer bracket.

A bolt is then inserted through a bolt hole through the safety mount bracket, through an aligned mounting hole through the transverse leg of the transformer bracket, and through an aligned hole through the strong-back. A nut and washer are then installed on the threaded end of the bolt shank which protrudes outward from the rear side of a strong-back. The nut is then tightened on the bolt shank, thus forcing the rearward protruding stabilizer ribs of the safety mount bracket into the indentations in the curved transverse leg of the transformer bracket. Tightening the nut on the bolt cause the curved transverse leg of the transformer bracket to be pressed between the curved rear surface of the safety mount bracket plate and the flat front surface of to strongback, thus securing the transformer bracket to the strongback.

The vertically-elongated contact regions between the curved longitudinal surfaces of the stabilizing ribs of upper and lower safety mount bracket plates and the complementarily-curved indentations in the transverse leg of upper and lower transformer brackets afford substantially large contact areas between the safety mount bracket plate and the transformer brackets. This novel construction provides a greater resistance to relative lateral and twisting movements between the transformer brackets and the cluster bracket than is provided by prior art attachment methods.

The improved cluster bracket according to the present invention also includes novel adjustable span-length diagonal braces which are effective in minimizing displacement of the cluster bracket from a power pole to which it is mounted, in response to movement of the pole during a seismic event, or as a result of static weight loads exerted on the cluster bracket and bracket mounting bolts.

According to the invention the cluster bracket is provided with a pair of identical adjustable span-length diagonal braces which extend obliquely rearwards from the rear side of the upper horizontal cross-beam. Each adjustable span-length diagonal brace includes a frame-mount channel member which is attached to the rear side of the upper cross-beam of the cluster bracket frame. The frame-mount channel member includes a vertically-disposed, rectangularly-shaped bracket-mount plate which is attached at a first short edge thereof to the upper cross-beam by a vertically-disposed inner hinge joint. The inner hinge joint of the frame-mount channel includes a hinge pin or pivot pin which is disposed perpendicularly between inner faces of upper and lower parallel side walls of the upper cross-beam.

The inner vertical hinge pins of the frame-mount channels of the two adjustable span-length diagonal braces are located at equal distances laterally outwards of a vertical center plane of the cluster bracket frame. Thus arranged, the left and right inner bracket-mount channels of the diagonal braces are pivotable about a vertical axis inwardly and outwardly relative to the vertical center plane of the cluster bracket frame.

Each frame-mount channel of an adjustable span-length diagonal brace has welded to the inner surface of the bottom wall of the channel a longitudinally-disposed rectangularly-shaped, vertically oriented inner interlocking extension plate which has formed in an outer surface thereof a continuous row of transversely-disposed regularly spaced-apart ridges and grooves.

Each adjustable span-length diagonal brace also includes an extendible pole-mount channel member which is longitudinally slidably mounted within the frame-mount channel and securable at adjustable horizontal extension lengths relative to the frame-mount channel member of the brace.

The extendible pole-mount channel member of each diagonal brace includes an outer interlocking extension plate which is welded to the outer surface of the bottom wall of the channel in the channel member. The outer interlocking extension plate has a shape and size similar to that of the inner interlocking extension plate which has formed in an outer flat surface thereof a continuous row of transversely disposed vertically oriented ridges and grooves. These ridges and grooves are shaped complementarily to the grooves and ridges of the inner interlocking extension plate.

Longitudinally-elongated, vertically-aligned slots are provided through the bottom walls of the frame-mount channel and pole-mount channel, and through both inner and outer interlocking extension plates. A bolt is inserted through the aligned slots, and a nut tightened onto the protruding shank of the bolt, thus lockingly securing the pole-mount channel member at a selected extension length relative to the frame-mount channel. Intermeshing ridges and grooves of the confronting surfaces of inner and outer interlocking extension plates ensure that an adjusted extension length is maintained.

Each adjustable-span diagonal brace also includes a slotted pole fastener plate which is pivotably attached to the outer vertically-oriented transverse end of the pole-mount channel member. The pole fastener plate has extending inwardly from an inner transverse edge thereof a pair of axially-aligned and spaced-apart tubular fastener-plate hinge knuckles which receive there between a pole-mount channel hinge knuckle that extends outwardly from the outer transverse edge of the pole-mount channel member. A cylindrical circular cross-section pivot bar disposed through the bores of the three hinge knuckles enables the pole fastener plate to be pivoted towards and away from parallel alignment with the pole-mount channel member.

With the foregoing novel construction, the pole-mount channel member of each adjustable-span diagonal brace can be extended and secured at a selected span distance obliquely rearwards from the cluster bracket frame. The extension length is adjusted to position the slotted pole fastener plate at the outer end of the brace in close proximity to a power pole to which the cluster bracket frame is attached. The pole fastener plate is then pivoted into contact with the pole, and secured thereto by a bolt inserted through the slotted perforation through the pole fastener plate and into the pole.

BRIEF DESCRIPTION OF THE DRAWINGS

FIG. 7 is a front perspective view of a top transformer safety mount bracket of the cluster bracket of FIG. 1.

FIG. 8 is a rear perspective view of the top transformer safety mount bracket of FIG. 7.

FIG. 9 is a front perspective view of a bottom transformer safety mount bracket of the cluster bracket of FIG. 1.

FIG. 10 is a rear perspective view of the bottom transformer safety mount bracket of FIG. 9.

FIG. 12 is a right-side upper perspective view of the brace of FIG. 11, showing a locking mating surface thereon.

FIG. 13 is a left-side lower perspective view of the brace of FIG. 11.

FIG. 14 is an exploded right-side perspective view of the brace of FIG. 11.

FIG. 15 is an exploded left-side perspective view of the brace of FIG. 11.

FIG. 20 is a fragmentary perspective view on a further enlarged scale of the structure of FIG. 18, showing one of the upper or lower transformer safety mount bracket structures thereof.

FIG. 21 is a fragmentary exploded perspective view of the cluster bracket of FIG. 1, showing one of three transformer mounting structures of the cluster bracket shown in FIG. 16.

DESCRIPTION OF THE PREFERRED EMBODIMENT

FIGS. 1-21 illustrate the construction and utilization of a novel seismic resistant multi-transformer cluster bracket with adjustable diagonal braces according to the present invention.

As shown in FIGS. 1,2,4, and 6, cluster bracket 30 according to the present invention includes a generally rectangularly-shaped, laterally elongated frame 31. Frame 31 includes an elongated straight upper horizontal cross-beam 32T and an identical lower horizontal cross-beam 32B which is disposed parallel to and spaced below the upper cross-beam.

Figure 4:
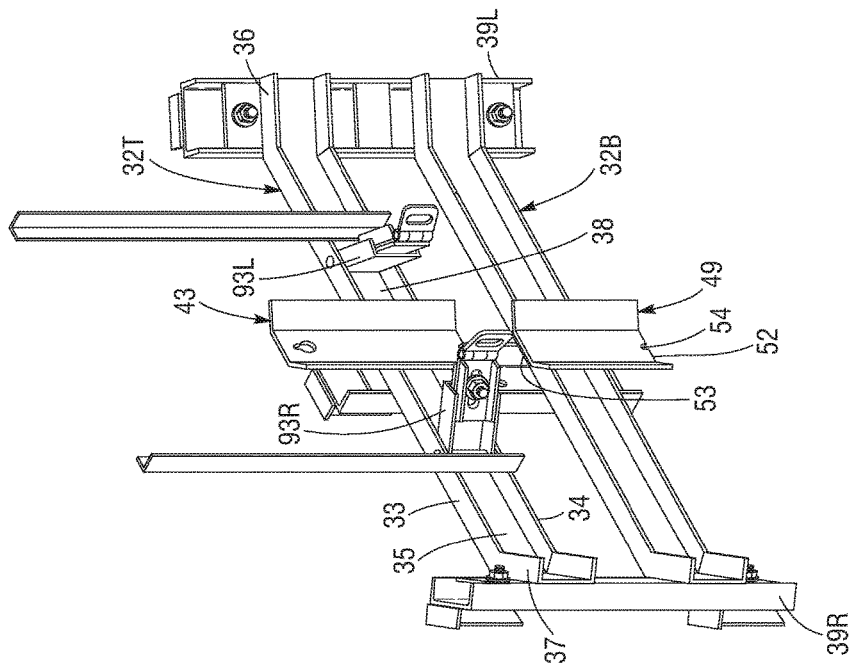
FIG. 4 is a rear perspective view of the cluster bracket of FIG. 1.
Figure 5:
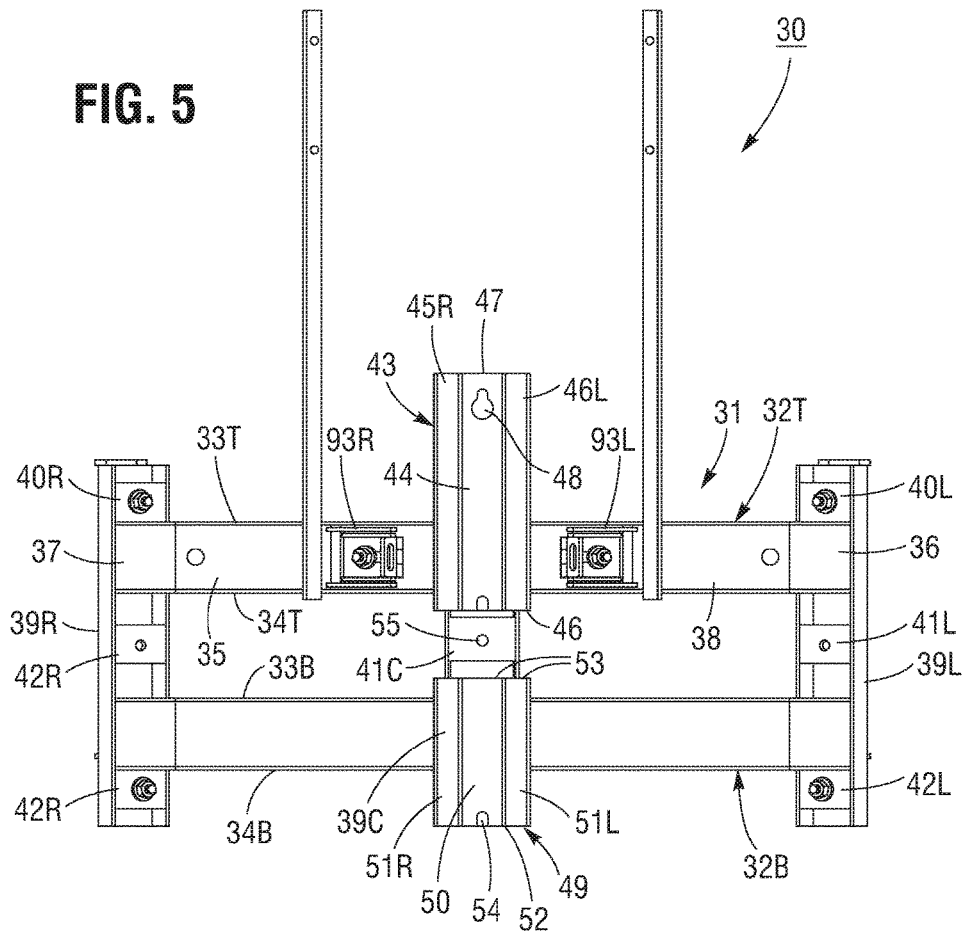
FIG. 5 is a rear elevation view of the cluster bracket of FIG. 1.

As may be seen best by referring to FIG. 4, upper and lower cross-beams 32T, 32B each have the from of a channel section which has a rectangular U-shaped transverse cross-sectional shape. Thus as shown in FIGS. 4 and 5, each cross-beam 32T, 32B has an upper side plate 33 and a lower side plate 34 which is parallel to the upper side plate. A wider front base plate 35 is disposed perpendicularly between front edges of the upper and lower side plates.

As may be seen best by referring to FIGS. 4 and 5, both upper cross-beam 32T and lower cross-beam 32B have at left and right ends thereof short left and right end sections 36 and 37, respectively, which are located at left and right ends of a straight center section 38 of each cross-beam. End sections 36 and 37 of upper and lower cross-beams 32T, 32B have upper and lower side plates and front base plates which are continuous with corresponding plates of the center section 38, and are angled rearwardly from the center section at a dihedral angle of about 30 degrees rearwardly from the front surface of the center section.

Referring again to FIGS. 1,2,5, and 6, it may be seen that cluster bracket frame 31 includes three parallel vertically-disposed struts or "strong-backs" 39 which are fastened to the upper and lower cross-beams 32T, 32B to thus form with the cross-beams a rigid frame structure. The strong-back struts consist of a left-side strong-back 39L, a center strong-back 39C, and a right-side strong-back 39R. As may be seen best by referring to FIGS. 1 and 3-5, each strong=back 39 has the form of a longitudinally elongated, rectangular cross-section channel.

Figure 1:
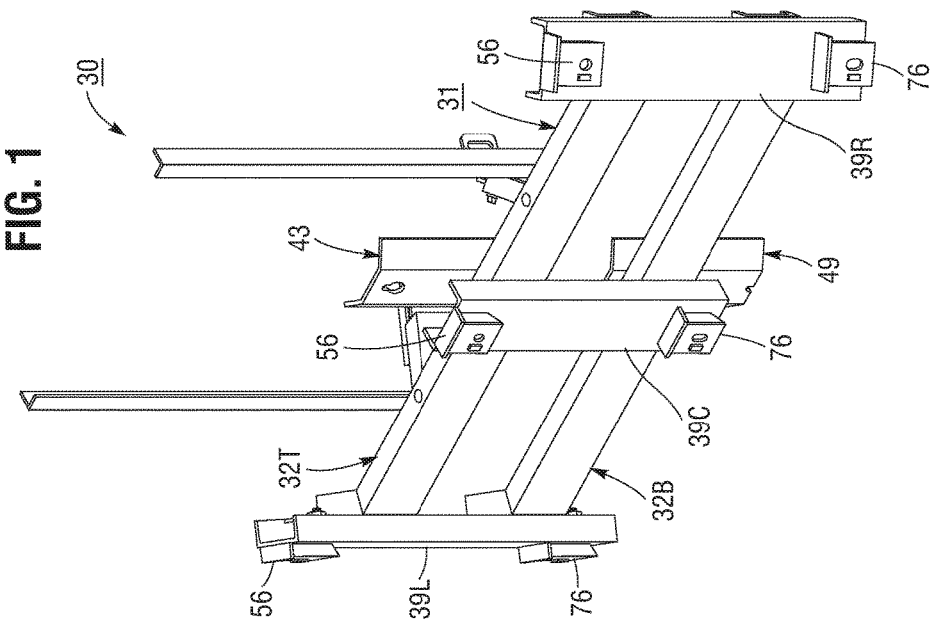
FIG. 1 is a front perspective view of a Seismic-Resistant Multi-Transformer Cluster Bracket With Adjustable Diagonal Braces according to the present invention.

As may be best understood by referring to FIGS. 1, 4, and 5, each strong-back 39 is welded to front sides of upper and lower cross-beams 32T, 32B. Left-side strong-back 39L is welded to front sides of upper and lower end sections 36T and 36B of upper and lower cross-beams 32T, 32B. Right-side strong-back 39R is welded to front sides of upper and lower end sections 37T, 37B of upper and lower cross-beams 32T, 32B. Also, center vertical strong-back 39C is welded to front sides of central sections 38T, 38B of the front sides of upper and lower cross-beams 32T, 32B.

As shown in FIGS. 4 and 5, each strong-back 39 is reinforced by a set of three rectangularly-shaped reinforcement plates which are positioned in a channel opening between opposed inner faces of the side plates of the strong-back and welded to the side plates. Thus as shown in FIGS. 4 and 5, each strong-back channel 39 has an upper end reinforcement plate 40 located adjacent to an upper transverse edge of the strong-back, a longitudinally centrally-located reinforcement plate 41, and a lower end reinforcement plate 42 located adjacent to a lower transverse edge of each strong-back.

Figure 6:
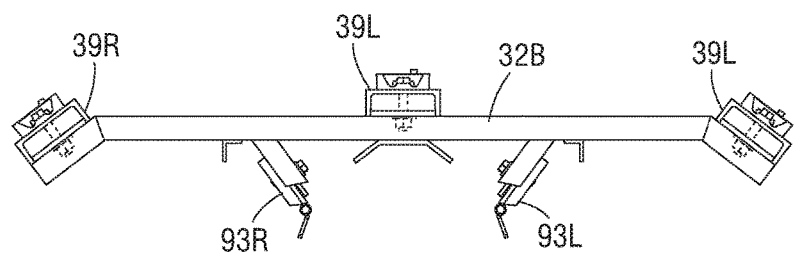
FIG. 6 is a lower plan view of the cluster bracket of FIG. 1.

As may be seen best by referring to FIGS. 4-6, cluster bracket 30 includes an upper pole-mount bracket 43 which is used to mount the cluster bracket 30 to a power pole. The upper pole mount bracket 43 has generally the shape of a longitudinally elongated channel section which includes an elongated rectangular base plate 44, and left and right longitudinally elongated angled channel side wall plates 45L, 45R which are angled obliquely outwards from left and right longitudinal side edges of the base plate.

As shown in FIGS. 4 and 5, base plate 44 of upper pole-mount bracket 43 is securely fastened to the rear side of upper horizontal cross-beam 32T, preferably by a welded joint. As shown in FIGS. 1, 4, and 5, a lower part of upper pole-mount bracket 43 extends a short distance below the lower side of upper horizontal cross-beam 32T, and has a lower transversely-disposed horizontal end wall 46.

As is shown in FIGS. 1, 4, and 5, an upper part of upper pole-mount bracket 43 extends a greater distance above the upper side of upper horizontal cross-beam 32T, and has an upper transversely-disposed horizontal end wall 47. An upper part of upper pole-mount bracket 43 has disposed through its thickness dimension an upper keyhole-shaped upper pole-mount bolt-hole 48 which is located on a longitudinal center line of the upper pole-mount bracket. Bolt-hole 48 is provided for receiving an upper support bolt disposed through a power-pole to which cluster bracket 30 is to be mounted.

Referring to FIGS. 1, 2, 4, and 5, it may be seen that cluster bracket 30 includes a lower pole-mount bracket 49 which is used to provide additional support for mounting the cluster bracket to a power pole. Lower pole-mount bracket 49 has a construction similar to that of upper pole-mount bracket 43. Thus lower pole-mount bracket 49 has a flat, rectangularly-shaped vertically-disposed longitudinally-elongated base plate 50, and left and right rectangular shaped, longitudinally-disposed angled side plates 51L, 51R. Also, lower pole-mount bracket 49 has a lower transverse horizontally-disposed end wall 52 which is located below the lower side edge plate 34B of lower horizontal cross-beam 32B, and an upper transverse end wall 53 which is located a short distance above the upper horizontal edge plate 33B of the lower horizontal cross-beam.

As may be seen best by referring to FIGS. 5 and 6, upper pole-mount bracket 43 and lower pole-mount bracket 49 are longitudinally aligned and laterally centered on a longitudinal center line of center strong-back 39C. As shown in FIGS. 5 and 6, lower transverse end wall 52 of lower pole-mount bracket 49 has extending upwardly therefrom a laterally centered, semi-circular bottom mounting bolt notch 54.

As shown in FIG. 5, center reinforcement plate 41 of center strong-back 39C preferably has through its thickness dimension a centrally located pole-mount bolt hole 55, which is longitudinally aligned with upper pole-mount bolt hole 48 and lower pole-mount notch 54.

FIGS. 7-10 illustrate novel transformer mounting members according to the present invention. The novel transformer mounting members provide a more secure means for attaching heavy electrical power distribution transformers to cluster bracket frame 31 than prior art transformer mounting methods, in part by minimizing possible lateral and twisting motions of transformers in response to movements of a power-pole in response to a seismic event.

Figure 2:
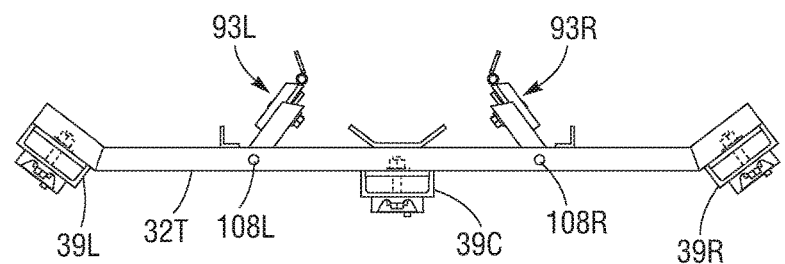
FIG. 2 is a front elevation view of the cluster bracket of FIG. 1.
Figure 3:
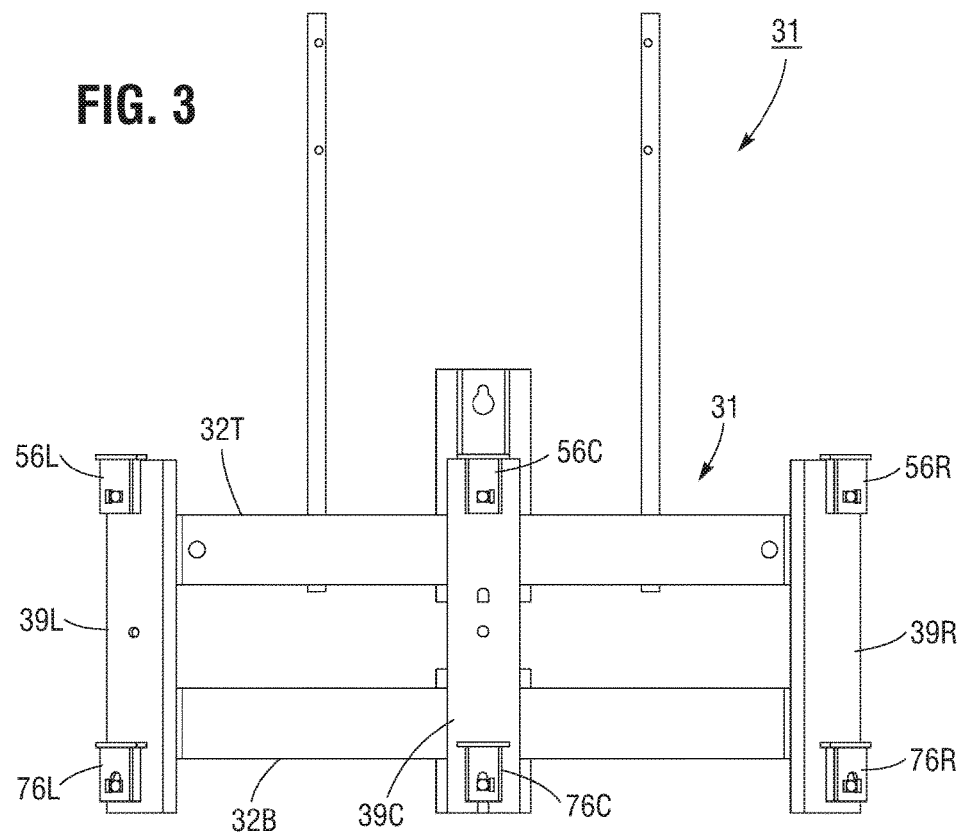
FIG. 3 is an upper plan view of the cluster bracket of FIG. 1.

As shown in FIGS. 7-10, the novel transformer mounting members according to the present invention include an upper "top" transformer safety mount bracket 56 and a lower "bottom" transformer safety mount bracket 76. As shown in FIGS. 1 and 2, three sets of brackets, each consisting of an upper safety mount bracket 56 and a lower safety mount bracket 76, are fastened to front sides of each of the left-side, center, and right-side strong-backs 39L, 39C, 39R, respectively, near upper and lower ends of each strong-back.

As shown in FIGS. 7 and 9, upper transformer safety mount bracket 56 has a vertically elongated rectangular front plate section 57, which is surmounted by a laterally-elongated rectangular cap plate section 58. Cap plate section 58 is disposed horizontally and perpendicularly to the front surface 59 of the front plate section 57, and extends rearwardly of the front plate section.

As shown in FIG. 7, rear edge 60 of cap plate section 58 has extending inwardly therefrom a laterally centrally located, shallow, arcuately curved notch 61.

As is also shown in FIG. 7, front plate section 57 of upper safety mount bracket 56 has disposed through its thickness dimension a circular mounting bolt hole 62 which is laterally centrally located a short distance above the lower edge 63 of the front plate section.

Front plate section 57 of upper safety mount bracket 56 also has protruding from the front surface thereof a vertically elongated, rectangularly-shaped boss or lug 64 which is located laterally adjacent to bolt hole 62. Lug 64 is provided to abut the head of a bolt inserted rearwardly into bolt hole 62, and thus prevent rotation of the bolt.

As shown in FIG. 9, upper transformer safety mount bracket 56 has protruding rearwardly from front plate section 57 of the bracket a pair of laterally spaced-apart, parallel, vertically disposed stabilizer ribs 65, 66. Each stabilizer rib 65, 66 has generally the shape of a vertically-elongated semi-cylinder which has a laterally outwardly located longitudinally-disposed side 67, 68 which is coextensive with an outer longitudinal edge 69, 70 of front plate section 57 of safety mount bracket plate 56.

As shown in FIG. 9, stabilizer ribs 65, 66 have laterally inwardly facing and confronting longitudinally-disposed inner sides 71, 72 which are located a short distance laterally outwards from opposite sides of mounting bolt hole 62. As may also be seen by referring to FIG. 9, stabilizer rib 66 has optionally formed in a lower end a longitudinally-disposed indexing notch 73 and in rib 65 an upper laterally-disposed indexing notch 74.

As shown in FIGS. 8 and 10, lower transformer safety mount bracket 76 has a construction which is identical to that of the upper transformer safety mount bracket 56, with the single exception of having a mounting bolt hole 82 which has vertically-elongated oval-shape rather than the circular shape of bolt hole 62 in upper transformer safety mount bracket 66. Thus lower transformer safety mount bracket 76 has elements 77-81 and 83-92 which are exactly analogous to elements 57-61 and 63-72 of upper transformer safety mount bracket 56.

FIGS. 11-15 illustrate the construction and function of a novel adjustable span-length diagonal brace of cluster bracket 30 according to the present invention. As may be seen best by referring to FIGS. 4 and 6, cluster bracket 30 according to the present invention includes two identical left and right adjustable span-length diagonal braces 93L, 93R, which are fastened to the rear side of upper horizontal cross-beam 32T at equal lateral distance outward of the vertical center plane of upper pole-mount bracket 43.

As may be seen by referring to FIGS. 11-15, each of the two diagonal braces 93L, 93R includes a frame-mount channel member 94 which is positioned between upper and lower side walls of the upper horizontal cross-beam 32T. As shown in FIGS. 11-15, each frame-mount channel member 94 includes a channel section 95 that has a U-shaped transverse cross-section. Channel section 95 of frame-mount channel member 94 includes a relatively wide, vertically oriented and longitudinally elongated base plate 96, and thinner upper and lower horizontally disposed side plates 97, 98. As shown in FIGS. 14 and 15, the base plate and side plates of channel section 95 form between inner facing surfaces thereof a longitudinally elongated, horizontally disposed channel 99 which has an outer transversely disposed entrance opening 100.

Channel section 95 of frame-mount channel member 94 includes a circular cross-section tubular pivot pin journal 101 which is disposed perpendicularly between upper and lower side plates 97, 98 of the channel member. Journal 101 is joined to rear transverse edges 102, 103 of upper and lower side plates 97, 98.

Figure 11:
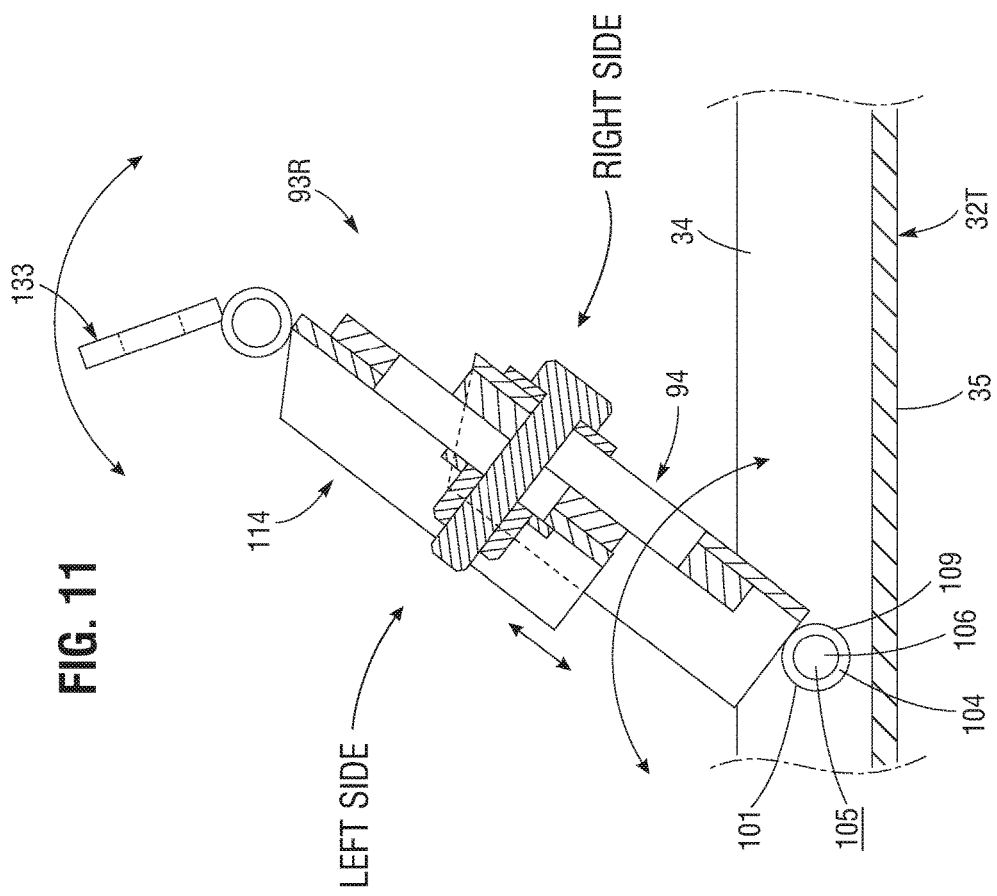
FIG. 11 is a fragmentary, partly sectional upper view on an enlarged scale of the cluster bracket of FIG. 1, showing one of two adjustable-span length diagonal braces thereof.

As shown in FIGS. 11 and 15, pivot pin journal 101 has extending through its length a coaxial bore 104 which receives therein a pivot pin 105. Pivot pin 105 has upper and lower ends 106, 107 which extend outwardly from pivot pin journal bore 101, and are anchored in vertically disposed bores 108, 109 provided through vertically aligned locations of upper and lower side plates 33 and 34 of the upper cross-beam 32T.

As shown in FIG. 11, the construction of frame-mount channel member 94 of each diagonal brace 93 enables the brace to be pivoted towards and away from the vertical center plane of cluster bracket frame 31.

As shown in FIGS. 13 and 15, channel section 95 of frame-mount channel member 94 has welded to the upper surface of base plate 96 of the channel member a longitudinally disposed, rectangularly shaped inner interlocking extension plate 110. Inner interlocking extension plate 110 has formed in its outer surface a longitudinally disposed row of alternating transversely disposed ridges and grooves 111, 112.

Referring to FIGS. 11-15, it may be seen that each adjustable span-length diagonal brace 93 includes an extendable pole-mount channel member 114. Pole-mount channel member 114 has a construction similar to that of frame-mount channel member 94, and is longitudinally slidably mounted within channel 99 of channel section 95 of the frame-mount channel member. Thus as shown in FIGS. 11-15, pole-mount channel member 114 includes a channel section 115 that has a U-shaped transverse cross-section. Channel section 115 of channel member 114 includes a relatively wide, vertically-oriented and longitudinally elongated base plate 116, and thinner upper and lower horizontally disposed side plates 117, 118.

As shown in FIGS. 14 and 15, channel section 115 of pole-mount channel member 114 has a longitudinally elongated, horizontally disposed channel section 119 which has an outer entrance opening 120.

Channel section 115 of pole-mount channel member 114 includes a circular cross-section, transversely disposed tubular hinge knuckle 121 which protrudes longitudinally outwards of an outer vertically disposed edge wall 121B of channel section 115. Hinge knuckle 121 is disposed perpendicularly to and located centrally between upper and lower side plates 117, 118 of pole-mount channel member 114. Hinge knuckle 121 has a length of about one-third the perpendicular distance between the upper and lower side plates 117, 118 of pole-mount channel member 114.

As shown in FIGS. 12 and 14, channel section 115 of pole-mount channel member 114 has welded to the outer surface of base plate 116 of the channel member a longitudinally disposed, rectangularly shaped outer interlocking extension plate 130. Outer interlocking extension plate 130 has formed in its outer surface a longitudinally disposed row of transversely disposed alternating ridges and grooves 131, 132.

As shown in FIGS. 12-15, the exterior width of pole-mount channel section 115 of pole-mount channel member 114, as measured between outer surfaces 117, 118 thereof, is slightly less than the width of channel 99 formed between inner surfaces of upper and lower side plates 97, 98 of bracket-mount channel member 94. Thus, as shown in FIGS. 11-13, pole-mount channel member 114 is longitudinally slidably receivable within channel 99 of bracket-mount channel member 94.

As shown in FIGS. 11-15, the pole-mount channel member 114 of each adjustable extension length diagonal brace 93 includes a transversely slotted pole-fastener plate 133 which is pivotably attached to outer transverse end 134 of the pole-mount channel member. As shown in the figures, pole-fastener plate 133 includes a uniform thickness outer rectangular plan-view fastener plate section 133A which has disposed rearwardly from a transverse edge thereof a pair of longitudinally spaced tubular upper and lower pole-fastener plate hinge knuckles 135, 136. Upper and lower pole-fastener plate hinge knuckles 135, 136 are located adjacent to upper and lower transverse edges 137, 138, respectively, of fastener plate section 133A. Opposed inner ends of upper and lower hinge knuckles 135, 136 are spaced apart at a distance slightly greater than the length of central hinge knuckle 121 of pole-mount channel member 115.

As shown in FIGS. 12-15, hinge knuckle 121 of pole-mount channel member 115 is received between upper and lower hinge knuckles 135, 136 of pole-fastener plate 133. The channel member and pole-fastener plate are hingedly jointed together by means of hinge pin 137 which is disposed through aligned fastener plate knuckle bores 138, 139, and a bore 140 through knuckle 121. With this construction, pole-fastener plate 133 is pivotable towards and away from pole-mount channel member 114, as shown in FIG. 11.

As is also shown in FIGS. 12-15, plate section 134 of pole-mount fastener plate 133 has disposed through its thickness dimension a vertically elongated oval-shaped bolt hole 133B for receiving a bolt used to secure the fastener plate section to a power-pole.

Referring still to FIGS. 12-15, it may be seen that bracket-mount channel member 94 has disposed through the base wall 142 thereof a longitudinally elongated rectangular perforation 143 which is centered between upper and lower longitudinally disposed side walls 97, 98 of the bracket-mount channel member. As is also shown in the figures, pole-mount channel member has disposed through the base wall 144 thereof a longitudinally elongated rectangular perforation 145 which is centered between upper and lower longitudinally disposed side walls 117, 118 of the pole-mount channel member 114.

As shown in FIGS. 12 and 13, perforations 143 and 144 have similar outlines and are aligned when pole-mount channel member 114 is received within channel 99 of bracket-mount channel member 94. Thus arranged, pole-mount channel member 114 can be adjusted to selected extension lengths relative to bracket-mount channel member 94 by sliding the pole-mount channel longitudinally inwardly or outwardly within channel 99 of the bracket-mount channel member. The pole-mount channel member 114 can then be secured at an adjusted extension length by tightening a nut 131 on a bolt 150 inserted through aligned perforations 143, 144 through the pole-mount channel member and the bracket-mount channel member.

As shown in FIGS. 1 and 4, cluster mount bracket 30 is optionally provided with a pair of vertically disposed left and right accessory equipment mounting uprights 151L, 151R. Each upright 151L, 151R consists essentially of an elongated straight "L" cross-section channel member which is welded to the rear side of upper cross-beam channel 32T.

FIGS. 16-21 illustrate an example of how electrical power distribution transformers are mounted to cluster bracket 30. The example illustrated in FIGS. 16-21 utilizes upper and lower transformer safety-mount brackets which, as described above, are particularly well-adapted to mounting transformers that are provided with a particular type of mounting bracket which has sinuously curved, or wave shaped outer transverse fastening section. However, as will be clear from the following discussion, cluster bracket 30 according to the present invention has novel and advantageous characteristics which provide improved mounting stability for transformers of various types in addition to those provided with curved wave brackets of the type shown in FIGS. 17-22.

Figure 16:
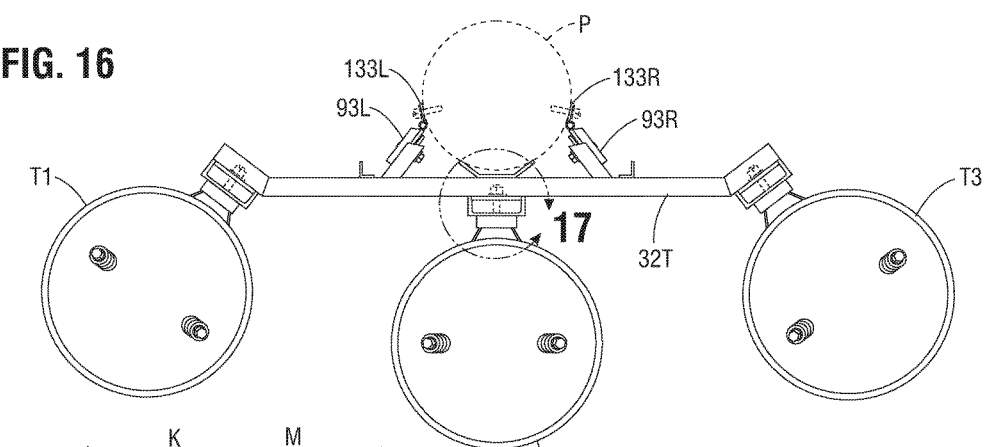
FIG. 16 is an upper plan view showing the cluster bracket shown in FIGS. 1-15 with three distribution transformers mounted to the cluster bracket.

Referring now to FIG. 16, a group of three electrical power distribution transformers T1, T2, T3 are shown to be mounted to cluster bracket 30. The three transformers T1, T2, T3 are fastened to left, center, and right strong-backs 39L, 39C, 39R, respectively. As may be understood by referring to FIGS. 17, 18, 20, and 21, each transformer T has protruding from a rear side of a cylindrical housing H thereof a pair of vertically spaced-apart, parallel, upper and lower curved mounting brackets BT and BB.

Figure 18:
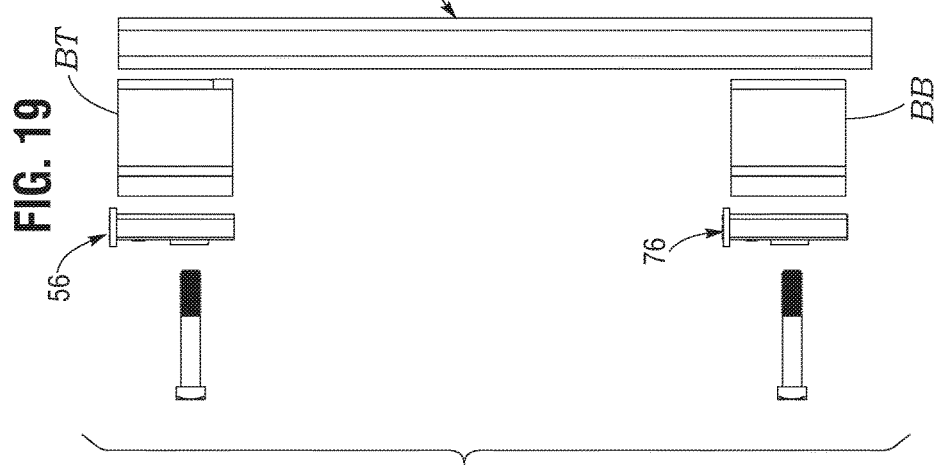
FIG. 18 is an exploded upper plan view on an enlarged scale of the mounting structure of FIG. 17.
Figure 19:
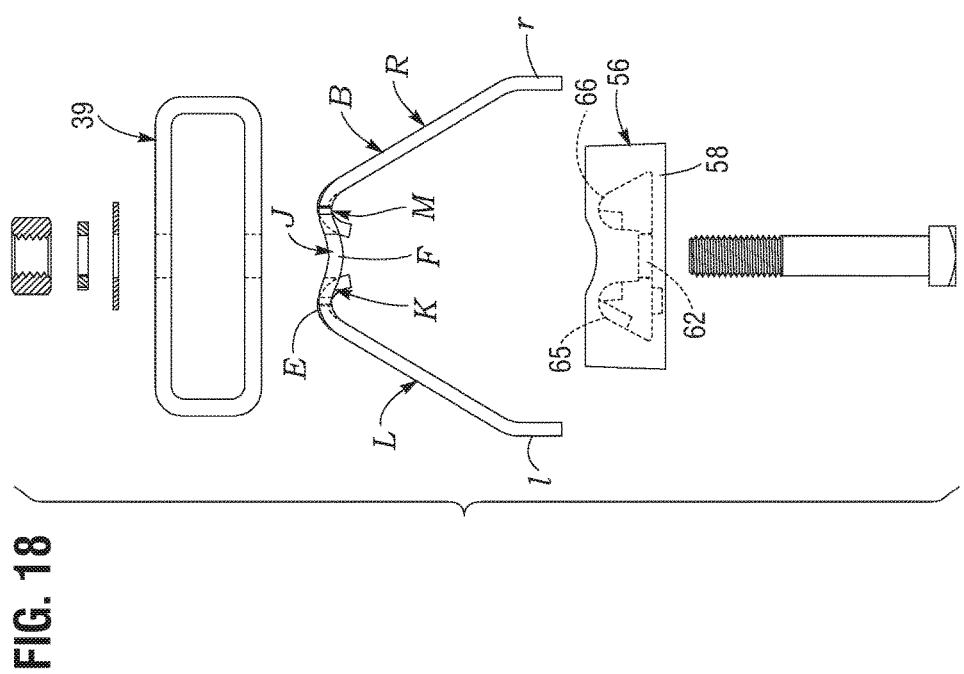
FIG. 19 is a fragmentary side elevation view of the cluster bracket transformer mounting structure of FIG. 18.

As may be seen best by referring to FIGS. 18, 20, and 21, each transformer bracket B has generally the form of an elongated, uniform thickness rectangular bar which is curved into an inverted U-shape. Thus as shown in FIGS. 18 and 20, bracket B has a laterally symmetric shape which includes a sinuously curved, wave-shaped outer transverse end section E, and outwardly and relatively long, rearwardly angled left and right leg front sections L and R. Each front leg section L, R has at a rear end thereof a shorter inwardly angled rear end section l, r, which together comprise a parallel pair of attachment members that are welded to housing H of transformer T.

As shown in FIG. 18, outer transverse end section E of transformer bracket B has in plan view an arcuately-curved, wave-like shape. Thus outer transversely disposed end section E of transformer bracket B has formed therein a radially inwardly, rearwardly depressed, arcuately-curved central indented section F. Central indented section F of transformer bracket B has at opposite laterally opposed sides thereon convex arcuately-curved transition sections G and H which join laterally outwardly and rearwardly angled left and right leg sections L and R, respectively. As shown in FIGS. 18 and 20, central indented section F of transformer bracket B has disposed radially through its thickness dimension a laterally centered mounting bolt hole J.

As shown in FIGS. 18 and 20, the central radially inwardly indented, arcuately-curved section shape of central section F of transformer bracket B forms between the central section and bracket legs L and R a pair of radially outwardly directed indentations K and M in the inner surface of bracket B.

Figure 17:
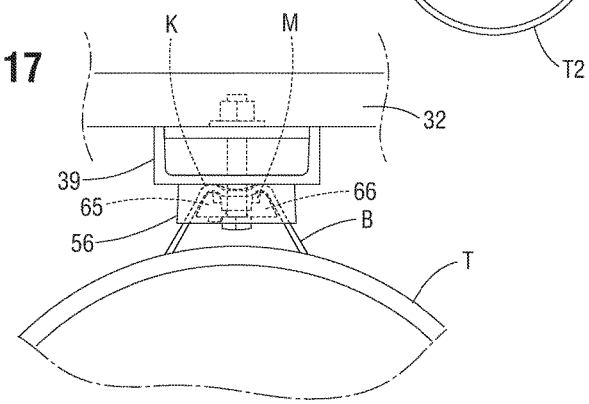
FIG. 17 is a fragmentary upper plan view on an enlarged scale of the cluster bracket and a mounted transformer of FIG. 16.

As may be understood by referring to FIGS. 9 and 10 in conjunction with FIGS. 17-2, left and right stabilizer ribs 65, 66 of an upper transformer safety-mount bracket 56 have an appropriate size, shape, and relative location to align conformally with left and right inner indentations K and M of an upper transformer bracket B.

Also, as may be best understood by referring to FIGS. 9 and 16-18, left and right stabilizer ribs 85, 88 of lower transformer safety-mount bracket 86 have an appropriate complementary size, shape, and relative location to align conformally with and fit into left and right inner indentations K and M of lower transformer bracket BB. Similarly, left and right stabilizing ribs 65, 68 of upper transformer safety-mount bracket 56 have an appropriate complementary size, shape, and relative location to align conformally with and fit into left and right inner indentations K and M of upper transformer bracket BT. This arrangement enables an upper and a lower transformer safety-mount bracket 56, 76 to be positioned rearward of the inner surface of the outer transverse leg of an upper and lower transformer bracket BT, BB. Fastener bolts are then inserted through the transformer back, through a bolt hole 62 or 82 through a transformer safety mount bracket 56 or 76, and through an upper and lower bolt hole through a strong-back 39. A nut is then tightened on the rearwardly protruding shank of each of the upper and lower attachment bolts, thus forcing ribs 65, 66, 85, 86 conformally into inner indentations K and M of the upper and lower transformer brackets BT and BB, respectively, thereby securely compressing the transformer brackets between the rear curved surfaces of the upper and lower transformer safety-mount brackets and the front surface of a strong-back strut, as shown in FIGS. 17 and 22.

FIG. 16 illustrates how the extension lengths of the left and right adjustable span-length diagonal braces 93L, 93R are adjusted to contact a power-pole with a cluster bracket 30 and attached transformers T. Typically the adjustment is made with the cluster bracket and attached transformers suspended by a crane near the ground level at which a power-pole is mounted. After the extension lengths of left and right diagonal braces 93L, 93R have been adjusted to contact the power-pole, the hinged pole-fastener plates 133A of each of the diagonal braces 93 is pivoted away from the power-pole. Cluster bracket 30 with attached transformers T is then hoisted to a predetermined installation height on the power-pole. Frame 31 of cluster bracket 30 is then attached to the power-pole by mounting bolts which are disposed through the power-pole and through mounting bolt holes in the upper frame support bracket and lower mounting bolt notch in the lower mounting bracket channel. Typically at least one additional mounting bolt is installed in a bore through center strong-back strut 39C and the power-pole.

After a cluster bracket frame 31 has been secured to a power-pole with vertically aligned attachment bolts as described above, the outer hinged and slotted pole-mount fastener plates 133A located at the outer ends of adjustable span-length diagonal braces 93L, 93R are pivoted into contact with and bolted to the power-pole with bolts inserted through bolt holes 133B in the pole-mount fastener plates.

What is claimed is:

1. A transformer cluster bracket for supporting at least one electrical power distribution transformer, said transformer cluster bracket comprising;
   a. a support frame having a front side and a rear side,
   b. at least a first rear pole attachment member attached to said rear side of said support frame for attaching said support frame to a power pole,
   c. at least a first transformer mounting bracket assembly attached to said front side of said support frame for attaching to and supporting at least a first transformer, and
   d. a pair of left and right adjustable extension length diagonal braces attached to said rear side of said support frame, said diagonal braces being extendable obliquely from said rear side of said support frame at adjustable span lengths from said support frame, each of said diagonal braces having at an outer end thereof a pole fastener plate for attachment to the power pole to which said support frame is mounted.

2. The transformer cluster bracket of claim 1 wherein said left and right adjustable extension length diagonal braces are spaced laterally apart at equal distance from a vertical center plane of said support frame.

3. The transformer cluster bracket of claim 1 wherein each of said left and right adjustable extension length diagonal braces includes a frame-mount brace member which is pivotably attached to said support frame.

4. The transformer cluster bracket of claim 1 wherein each of said left and right adjustable extension length diagonal braces includes a pole-mount brace member which is securable at adjustable extension lengths relative to a said frame-mount brace member.

5. The transformer cluster bracket of claim 4 wherein each of said frame-mount brace members is attached to said support frame by a frame-mount pivot joint which enables pivotable movement of said frame-mount brace member towards and away from said support frame.

6. The transformer cluster bracket of claim 5 wherein each of said pole-mount brace members has attached to an outer end thereof a pivot joint which pivotably supports a said pole fastener plate and enables said pole fastener plate to be pivoted towards and away from said support frame.

7. The transformer cluster bracket of claim 6 wherein said pole-mount brace member is longitudinally slidably mounted to said frame-mount member.

8. The transformer cluster bracket of claim 1 wherein said transformer mounting bracket assembly includes a lower transformer mounting bracket which is located below and in vertical alignment with said upper transformer mounting bracket, said lower transformer mounting bracket having a construction substantially similar to that of said upper transformer mounting bracket.

9. The transformer cluster bracket of claim 8 wherein each of said upper and lower transformer mounting brackets has protruding rearward from a rear surface of a plate section thereof a pair of laterally spaced apart vertically oriented stabilizer ribs which fit conformally into indentations in the inner surface of a curved outer transverse leg section of a transformer bracket.

10. A transformer cluster bracket for supporting at least one electrical power distribution transformer, said transformer cluster bracket comprising;
   a. a support frame; having a front side and a rear side, b. at least a first rear pole attachment member attached to said rear side of said support frame for attaching said support frame to a power pole, c. at least a first transformer mounting bracket assembly attached to said front side of said support frame for attaching to and supporting a first transformer, said first transformer mounting bracket assembly comprising;

I. an upper transformer mounting bracket which has a front plate section having a generally flat front surface and an arcuately curved rear surface which has a shape complementary to and fittable into the inner curved surface of a curved outer transverse section of a transformer bracket which protrudes rearward from a transformer, said upper transformer support bracket having disposed through its thickness a hole for receiving a bolt inserted through an aligned hole through said transverse leg section of said upper transformer mounting bracket, and through an aligned hole disposed through a member of said support frame and secured to said member by a nut tightened onto a rearwardly protruding threaded shank of said bolt, and d. a pair of left and right adjustable extension length diagonal braces attached to said rear side of said support frame, said adjustable extension length diagonal braces being extendable obliquely from said rear side of said support frame at adjustable span lengths from said support frame, each of said diagonal braces having at an outer end thereof a pole fastener plate for attachment to a power pole to which said support frame is mounted.

11. The transformer cluster bracket of claim 10 wherein said left and right adjustable extension length diagonal braces are spaced laterally apart at equal distance from a vertical center plane of said support frame.

12. The transformer cluster bracket of claim 11 wherein each of said left and right adjustable extension length diagonal braces includes a frame-mount brace member which is pivotably attached to said support frame.

13. The transformer cluster bracket of claim 12 wherein each of said left and right adjustable extension length diagonal braces includes a pole-mount brace member which is securable at adjustable extension lengths relative to a said frame-mount brace member.

14. The transformer cluster bracket of claim 13 wherein each of said frame-mount brace members is attached to said support frame by a frame-mount pivot joint which enables pivotable movement of said frame-mount brace member towards and away from said support frame.

15. The transformer cluster bracket of claim 14 wherein each of said pole-mount brace members has attached to an outer end thereof a pivot joint which pivotably supports a said pole fastener plate and enables said pole fastener plate to be pivoted towards and away from said support frame.

16. The transformer cluster bracket of claim 15 wherein said pole-mount brace member is longitudinally slidably mounted to said frame-mount member.

17. The transformer cluster bracket of claim 10 wherein said support frame is further defined as being comprised of at least two horizontally disposed beam members and three vertically disposed strong-back members.

18. The transformer cluster bracket of claim 17 wherein a said transformer mounting bracket assembly is attached to each of said strong-back members.

19. The transformer cluster bracket of claim 18 wherein said support frame has in front elevation view a generally rectangular shape.

20. The transformer cluster bracket of claim 1 further including a second transformer mounting bracket assembly attached to said front side of said support frame at a location spaced laterally apart from said first transformer mounting bracket assembly.

21. The transformer cluster bracket of claim 20 further including a third transformer mounting bracket assembly attached to said first side of said support frame at a location spaced laterally between said first and second transformer mounting bracket assemblies.

22. The transformer cluster bracket of claim 10 wherein said transformer mounting bracket assembly includes a lower transformer mounting bracket which is located below and in vertical alignment with said upper transformer mounting bracket, said lower transformer mounting bracket having a construction substantially similar to that of said upper transformer mounting bracket.

23. The transformer cluster bracket of claim 10 further including a second transformer mounting bracket assembly attachable to said front side of said support frame at a location spaced laterally apart from said first transformer mounting bracket assembly.

24. The transformer cluster bracket of claim 23 further including a third transformer mounting bracket assembly attached to said front side of said support frame at a location spaced laterally between said first and second transformer mounting bracket assemblies.

* * * * *